(12) United States Patent
Meng et al.

(10) Patent No.: US 10,088,889 B2
(45) Date of Patent: Oct. 2, 2018

(54) METHOD AND DEVICE FOR WAKING UP A CONTROLLER

(71) Applicant: Xiaomi Inc., Beijing (CN)

(72) Inventors: Deguo Meng, Beijing (CN); Yi Ding, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 140 days.

(21) Appl. No.: 15/178,202

(22) Filed: Jun. 9, 2016

(65) Prior Publication Data
US 2017/0003728 A1    Jan. 5, 2017

(30) Foreign Application Priority Data

Jul. 1, 2015 (CN) .......................... 2015 1 0379727

(51) Int. Cl.
| | | |
|---|---|---|
| *G06F 1/00* | (2006.01) | |
| *G06F 1/32* | (2006.01) | |
| *G06F 9/4401* | (2018.01) | |
| *H04W 52/02* | (2009.01) | |

(52) U.S. Cl.
CPC .......... *G06F 1/3243* (2013.01); *G06F 1/3293* (2013.01); *G06F 9/4418* (2013.01); *H04W 52/0293* (2013.01); *Y02D 10/122* (2018.01); *Y02D 10/152* (2018.01); *Y02D 70/00* (2018.01); *Y02D 70/142* (2018.01); *Y02D 70/144* (2018.01); *Y02D 70/166* (2018.01)

(58) Field of Classification Search
None
See application file for complete search history.

(56) References Cited

U.S. PATENT DOCUMENTS

| | | | | |
|---|---|---|---|---|
| 9,298,237 | B1* | 3/2016 | Jouin | ............... G06F 1/266 |
| 2009/0089545 | A1* | 4/2009 | Kwon | ............... G06F 15/167 |
| | | | | 712/36 |
| 2009/0300070 | A1* | 12/2009 | Kawajiri | ............... G06F 1/3209 |
| 2010/0106876 | A1* | 4/2010 | Nakahashi | ............... G06F 13/26 |
| | | | | 710/261 |
| 2012/0249431 | A1 | 10/2012 | Li | |

(Continued)

FOREIGN PATENT DOCUMENTS

| | | |
|---|---|---|
| CN | 102736820 A | 10/2012 |
| CN | 103235721 A | 8/2013 |

(Continued)

OTHER PUBLICATIONS

International Search Report and Written Opinion issued in corresponding International Application No. PCT/CN2015/090609, dated Apr. 6, 2016, 12 pages.

(Continued)

*Primary Examiner* — Paul Yen
(74) *Attorney, Agent, or Firm* — Arch & Lake LLP

(57) ABSTRACT

A method and a device are provided for waking up a MCU. The method includes: determining whether a second MCU is in a deep sleep state, when a first MCU triggers a communication event of transmitting data to the second MCU; and when the second MCU is in the deep sleep state, sending an interrupt wakeup signal to the second MCU via a wakeup pin connected between the first MCU and the second MCU, so as to wake up the second MCU.

12 Claims, 9 Drawing Sheets determining whether a second MCU is in a deep sleep state, when a first MCU triggers a communication event of transmitting data to the second MCU  101 when the second MCU is in the deep sleep state, the first MCU sends an interrupt wakeup signal to the second MCU via a wakeup pin connected between the first MCU and the second MCU, so as to wake up the second MCU  102

(56) References Cited

U.S. PATENT DOCUMENTS

2014/0215016 A1* 7/2014 Ke .................... G06F 3/00
                                                      709/217
2014/0304538 A1  10/2014 Chen et al.
2015/0006922 A1   1/2015 Huang et al.

FOREIGN PATENT DOCUMENTS

| CN | 103412634 A | 11/2013 |
| CN | 104281465 A | 1/2015 |
| EP | 0562885 A2 | 9/1993 |
| JP | H09190417 A | 7/1997 |
| JP | 2002351436 A | 12/2002 |
| JP | 2004213423 A | 7/2004 |
| JP | 2006277027 A | 10/2006 |
| JP | 2010140244 A | 6/2010 |
| JP | 2014126915 A | 7/2014 |
| KR | 1020140027875 A | 3/2014 |
| RU | 2340365 C2 | 12/2008 |
| RU | 2488241 C2 | 7/2013 |
| WO | 2012026299 A1 | 3/2012 |

OTHER PUBLICATIONS

English translation of International Search Report issued in corresponding International Application No. PCT/CN2015/090609, dated Apr. 6, 2016, 2 pages.
Extended European Search Report issued in corresponding EP Application No. 16161816, dated Nov. 25, 2016, 7 pages.
Japan Patent Office, Notification of Reasons for Refusal, Application No. 2017-525669, dated Oct. 6, 2017.
Korean Intellectual Property Office, Notification of Reason for Refusal, Application No. 10-2016-7009444, dated Sep. 7, 2017.
Office Action issued in corresponding Russian Application No. 2016117390/08(027396) dated Sep. 4, 2017, 7 pages.

* cited by examiner

METHOD AND DEVICE FOR WAKING UP A CONTROLLER

This application is based on and claims priority to Chinese Patent Application Serial No. CN201510379727.X, filed with the State Intellectual Property Office of P. R. China on Jul. 1, 2015, the entire content of which is incorporated herein by reference.

FIELD

The present disclosure relates to an intelligent device technology field, and more particularly to a method and a device for waking up a controller such as a Microcontroller Unit (MCU).

BACKGROUND

With the development of intelligent devices, energy consumption control becomes more and more important. Therefore, it is desirable to place an MCU in an intelligent device into a deep sleep state when idle, thus reducing the energy consumption of the intelligent device.

When there is a need to execute relevant logic, the system will generate an inner interrupt event in the MCU, so as to wake up the MCU. However, when multiple MCUs work cooperatively in the intelligent device, once one MCU is in the deep sleep state, other MCUs may not communicate with it externally, until the MCU in the deep sleep state is woken up internally.

SUMMARY

In order to solve problems in the related art, the present disclosure provides a method and a device for waking up a controller or processor, such as an MCU (e.g., MPU or SOC). The technical solutions are as follows.

According to a first aspect of the present disclosure, a method for waking up a MCU in an intelligent device having multiple MCUs is provided. In the method, a first MCU determines whether a second MCU is in a deep sleep state, when the first MCU triggers a communication event of transmitting data to the second MCU. When the second MCU is in the deep sleep state, the first MCU sends an interrupt wakeup signal to the second MCU via a wakeup pin connected between the first MCU and the second MCU, so as to wake up the second MCU.

In a second aspect of the present disclosure, a device includes a first MCU, a second MCU, and a wakeup pin connected between the first MCU and the second MCU. The first MCU determines whether the second MCU is in a deep sleep state, when a first Microcontroller Unit MCU triggers a communication event of transmitting data to the second MCU. The first MCU is configured to send an interrupt wakeup signal to the second MCU via the wakeup pin when the second MCU is in the deep sleep state, so as to wake up the second MCU.

In a third aspect of the present disclosure, a device for waking up a MCU is provided. The device includes: a MCU and a non-transitory accessible to the MCU. The non-transitory memory is configured to store instructions executable by the MCU. When the instructions are executed, the MCU is configured to determine whether a second MCU is in a deep sleep state, when the MCU triggers a communication event of transmitting data to the second MCU. When the second MCU is in the deep sleep state, the MCU sends an interrupt wakeup signal to the second MCU via a wakeup pin connected between the MCU and the second MCU, so as to wake up the second MCU.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

In order to make objectives, technical solutions and advantages of the present disclosure clearer, exemplary embodiments will be described in detail herein with reference to accompanying drawings.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner. An MCU or multiple MCUs are used throughout this disclosure as an example. The methods and device illustrated below applies to other type of processors or controllers.

Figure 1A:
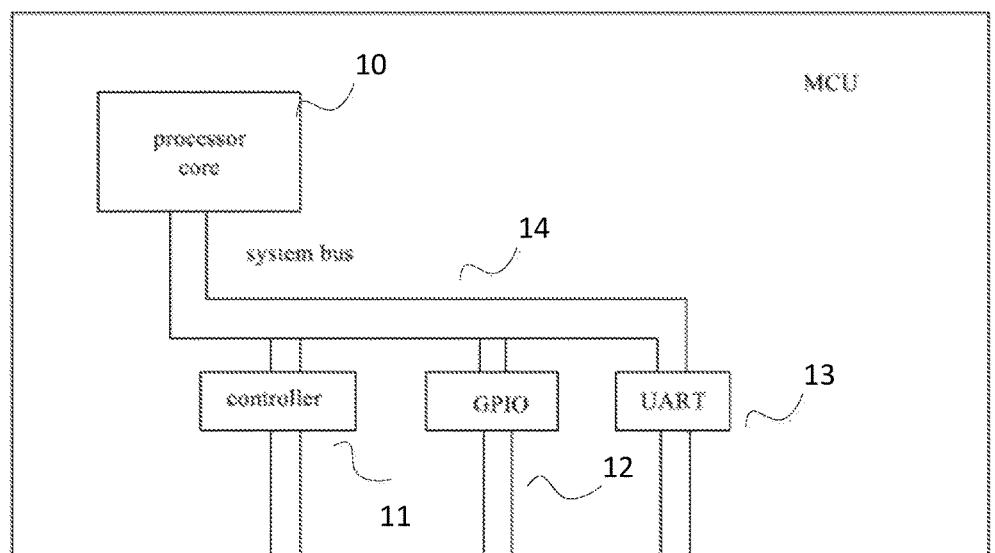
FIG. 1A shows a block diagram for a MCU.
Figure 1B:
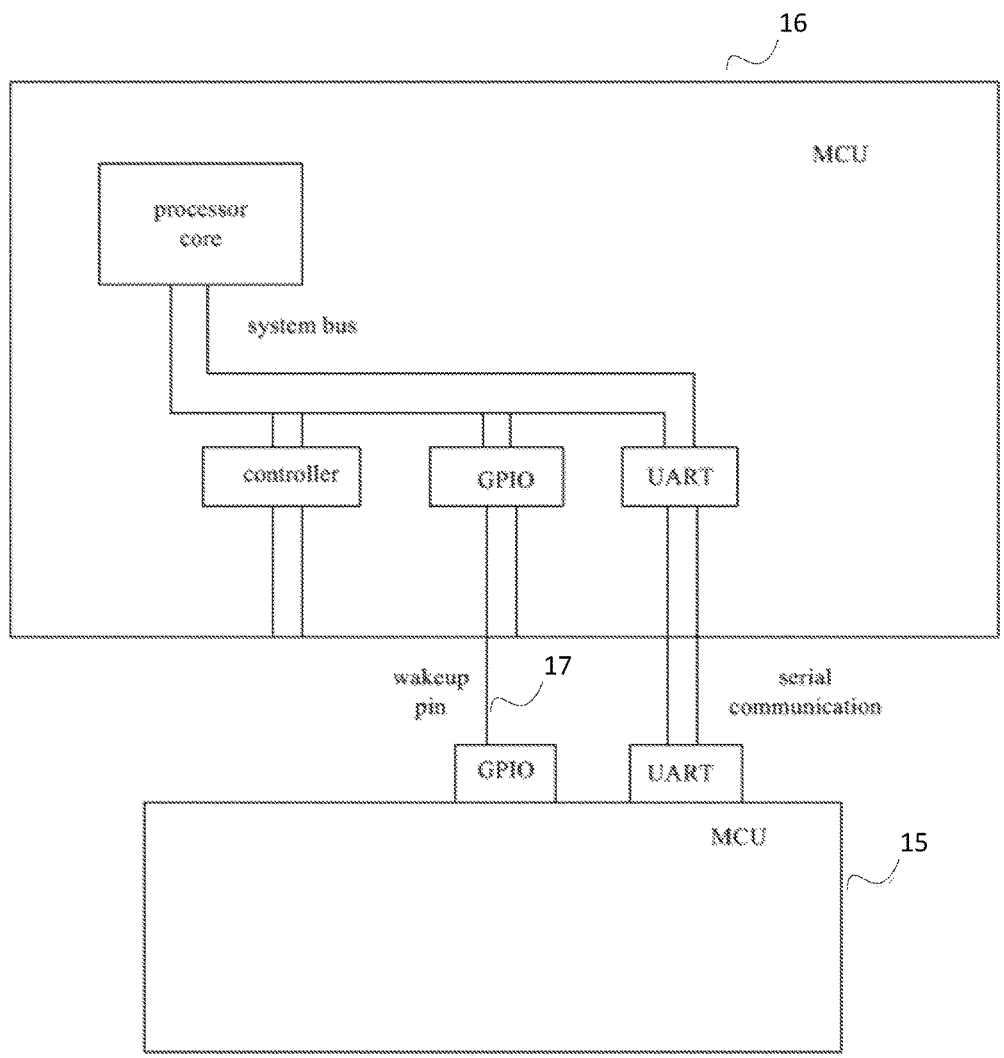
FIG. 1B shows two MCUs in communication and collaboration with one another.

FIG. 1A shows a block diagram of a typical MCU comprising a processor core 10 connected to controller 11, general purpose input output (GPIO) interface 12, and a universal asynchronous receiver/transmitter (UART) interface 13 via a system bus 14. FIG. 1B shows a system with two MCUs 15 and 16 in communication with one another. For example, the two MCUs may communicate via the UART interfaces. Further, the two MCUs may each comprise a wakeup pin 17. The MCUs may be in an active state or a sleep state (or standby state) and may be waked up from the sleep state into the active state. The MCUs may be a shallow sleep state or a deep sleep state. For shallow sleep state, the MCU may be waked up via either the wakeup pin or other communication interfaces such as the UART interface. In a deep sleep state, however, the MCU may only be wakeup via the wakeup pin.

Figure 1C:
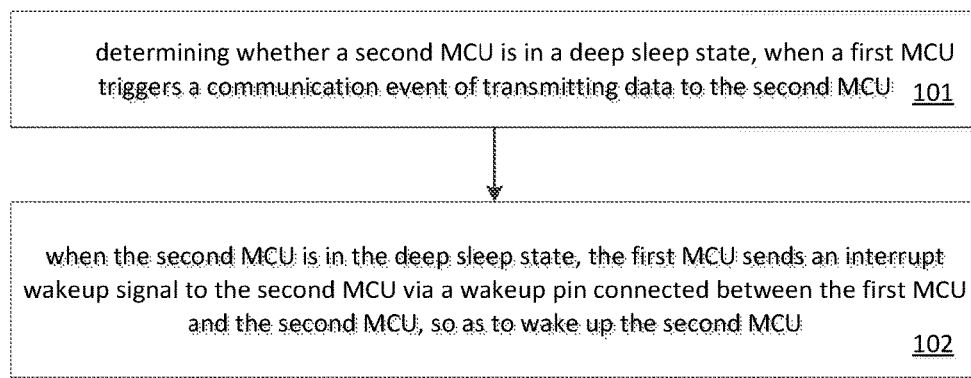
FIG. 1C is an example flow chart of a method for waking up a MCU according to an exemplary embodiment.

In an exemplary embodiment of the present disclosure, a method for waking up a MCU is provided. The method may be implemented in an intelligent device. As shown in FIG. 1C the method may include the following steps.

In step 101, when a first MCU (e.g., 15 of FIG. 1B) triggers a communication event of transmitting data to a second MCU (e.g., 16 of FIG. 1B), the first MCU determines whether the second MCU is in a deep sleep state.

In step 102, when the second MCU is in the deep sleep state, an interrupt wakeup signal is sent to the second MCU via a wakeup pin connected between the first MCU and the second MCU, so as to wake up the second MCU.

Alternatively or additionally, determining whether a second MCU is in a deep sleep state includes:
  obtaining a pre-stored state parameter of the second MCU, where the pre-stored state parameter of the second MCU is determined according to a first state updating message sent by the second MCU; and
  if the pre-stored state parameter of the second MCU indicates the deep sleep state, determining that the second MCU is in the deep sleep state.

Alternatively or additionally, determining whether a second MCU is in a deep sleep state includes:
  sending a detecting message to the second MCU via a communication interface between the first MCU and the second MCU; and
  if no response message returned from the second MCU is received within a preset time period, determining that the second MCU is in the deep sleep state.

Alternatively or additionally, after sending an interrupt wakeup signal to the second MCU so as to wake up the second MCU, the method further includes:
  receiving a second state updating message sent by the second MCU, where a state parameter carried in the second state updating message indicates a working state; and
  determining that the second MCU has been woken up according to the second state updating message, and transmitting data to the second MCU via the communication interface between the first MCU and the second MCU.

Alternatively or additionally, after receiving a second state updating message sent by the second MCU, the method further comprises:
  updating the pre-stored state parameter of the second MCU according to the state parameter carried in the second state updating message.

In embodiments of the present disclosure, by sending the interrupt wakeup signal to the second MCU via the wakeup pin connected between the first MCU and the second MCU, the MCU in the deep sleep state may be woken up by other MCUs through triggering an external interrupt event, without waiting for an inner interrupt event in the MCU under the deep sleep state, thus improving the efficiency of communication between MCUs.

Figure 2:
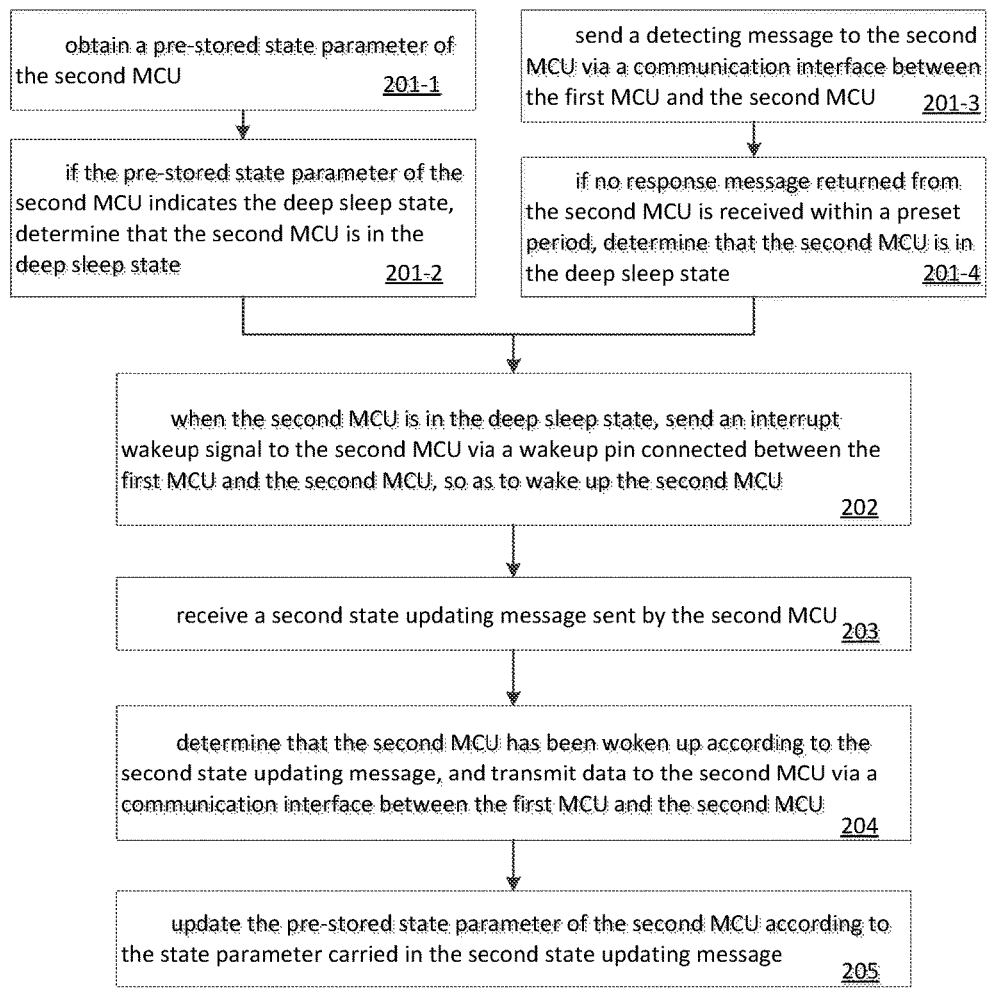
FIG. 2 is an example flow chart of a method for waking up a MCU according to an exemplary embodiment.

In an exemplary embodiment of the present disclosure, a method for waking up a MCU is provided. The method may be implemented in an intelligent device. As shown in FIG. 2, the method may include following steps.

In step 201, when a first MCU triggers a communication event of transmitting data to a second MCU, the first MCU determines whether the second MCU is in a deep sleep state.

For example, the first MCU may determine whether the second MCU is in a deep sleep state in two approaches, and accordingly, the step 201 may include following steps.

The first approach includes steps 201-1 and 201-2. In step 201-1, a pre-stored state parameter of the second MCU is obtained, where the pre-stored state parameter of the second MCU is determined according to a first state updating message sent by the second MCU. In step 201-2, if the pre-stored state parameter of the second MCU indicates the deep sleep state, it is determined that the second MCU is in the deep sleep state.

The second approach includes steps 201-3 and 201-4. In step 201-3, a detecting message is sent to the second MCU via a communication interface between the first MCU and the second MCU. In step 201-4, if no response message returned from the second MCU is received within a preset period, it is determined that the second MCU is in the deep sleep state.

In step 202, when it is determined that the second MCU is in the deep sleep state, the first MCU sends an interrupt wakeup signal to the second MCU via a wakeup pin connected between the first MCU and the second MCU, so as to wake up the second MCU.

In step 203, a second state updating message sent by the second MCU is received, where a state parameter carried in the second state updating message indicates a working state.

In step 204, it is determined that the second MCU has been woken up according to the second state updating message, and data is transmitted to the second MCU via a communication interface between the first MCU and the second MCU.

In step 205, the pre-stored state parameter of the second MCU is updated according to the state parameter carried in the second state updating message.

Alternatively or additionally, step 205 is a following step after determining whether the second MCU is in the deep sleep state in the first way. Relating to determine whether the second MCU is in the deep sleep state in the second way, step 205 may not be performed.

In the embodiments of the present disclosure, by sending the interrupt wakeup signal to the second MCU via the wakeup pin connected between the first MCU and the second MCU, the MCU in the deep sleep state may be woken up by other MCUs through triggering an external interrupt event, without waiting for an inner interrupt event in the MCU under the deep sleep state, thus improving the efficiency of communication between MCUs.

Figure 3:
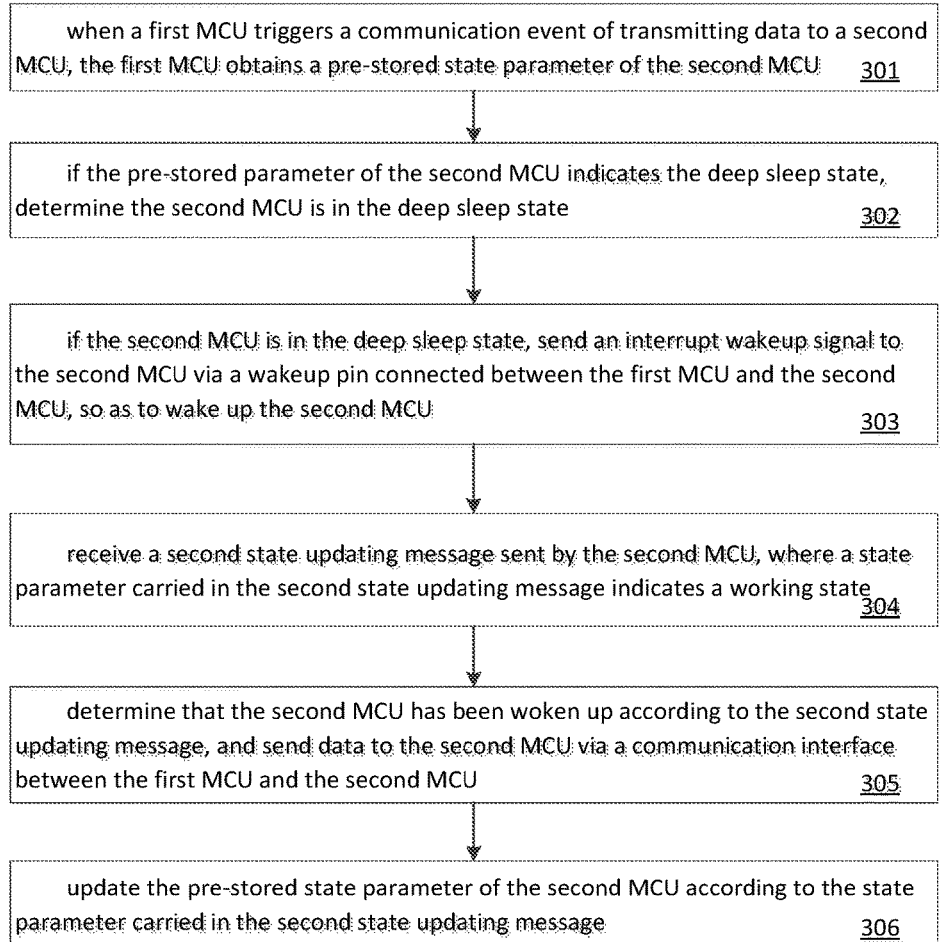
FIG. 3 is an example flow chart of a method for waking up a MCU according to an exemplary embodiment.

In an exemplary embodiment of the present disclosure, a method for waking up a MCU is provided, which is applied to an intelligent device, and as shown in FIG. 3, the method includes following steps.

In step 301, when a first MCU triggers a communication event of transmitting data to a second MCU, the first MCU obtains a pre-stored state parameter of the second MCU, where the pre-stored state parameter of the second MCU is determined according to a first state updating message sent by the second MCU.

In the embodiments of the present disclosure, the first MCU determines whether the second MCU is in a deep sleep state according to a pre-stored state parameter of the second MCU in a register of the first MCU, which is configured to store a parameter list storing the state parameter of each MCU in an intelligent device.

When entering the deep sleep state or switching to a working state from the deep sleep state, the MCU in the intelligent device sends a state updating message to other MCUs via a communication interface connected between the MCU itself and the other MCUs, so as to inform a state of itself to the other MCUs, where, the state parameter carried in the state updating message may indicate the deep sleep state or the working state, etc. The state parameter is not limited to the examples in the disclosure.

Before transmitting data to the second MCU, the first MCU may check the state parameter of the second MCU in the parameter list stored locally, and then determine whether to perform a wakeup procedure according to the state found.

In step 302, if the pre-stored parameter of the second MCU indicates the deep sleep state, it is determined that the second MCU is in the deep sleep state.

Here, if the state parameter found indicates the deep sleep state, the second MCU is woken up by performing the wakeup procedure in the embodiments of the present disclosure, and then a communication procedure is performed.

In step 303, when the second MCU is in the deep sleep state, the first MCU sends an interrupt wakeup signal to the second MCU via a wakeup pin connected between the first MCU and the second MCU, so as to wake up the second MCU.

Here, the wakeup pin is connected between the first MCU and the second MCU, such that the interrupt wakeup signal may be sent to one MCU via the wakeup pin connected between two MCUs when the MCU is in the deep sleep state, thus waking up the MCU via an interrupt event triggered from outside, besides via an inner interrupt event triggered when there is a need to execute the relevant logic.

In step 304, a second state updating message sent by the second MCU is received, where a state parameter carried in the second state updating message indicates a working state.

Here, a communication interface is also connected between the first MCU and the second MCU, where the communication interface may include a serial port, an Inter-Integrated Circuit I2C interface, a Serial Peripheral Interface SPI, and etc. Communication in forms like sending data and sending the state updating message may be performed via the communication interface.

After the second MCU is woken up by the external interrupt wakeup message from the first MCU, the second MCU sends a state updating message to the first MCU via the communication interface, where the state parameter carried in the state updating message indicates the working state.

In step 305, it is determined that the second MCU has been woken up according to the second state updating message, and data is transmitted to the second MCU via the communication interface between the first MCU and the second MCU.

After receiving the state updating message from the second MCU, the first MCU obtains the working state of the second MCU by analyzing the state parameter carried in the state updating message, and then triggers the operation of transmitting data to the second MCU.

In step 306, the pre-stored state parameter of the second MCU is updated according to the state parameter carried in the second state updating message.

Here, the step of updating the pre-stored state parameter of the second MCU in the parameter list may be performed after step 304, and does not have a strict order with step 305.

In the embodiments of the present disclosure, by sending the interrupt wakeup signal to the second MCU via the wakeup pin connected between the first MCU and the second MCU, the MCU in the deep sleep state may be woken up by other MCUs through triggering an external interrupt event, without waiting for an inner interrupt event in the MCU under the deep sleep state, thus improving the efficiency of communication between MCUs.

Figure 4:
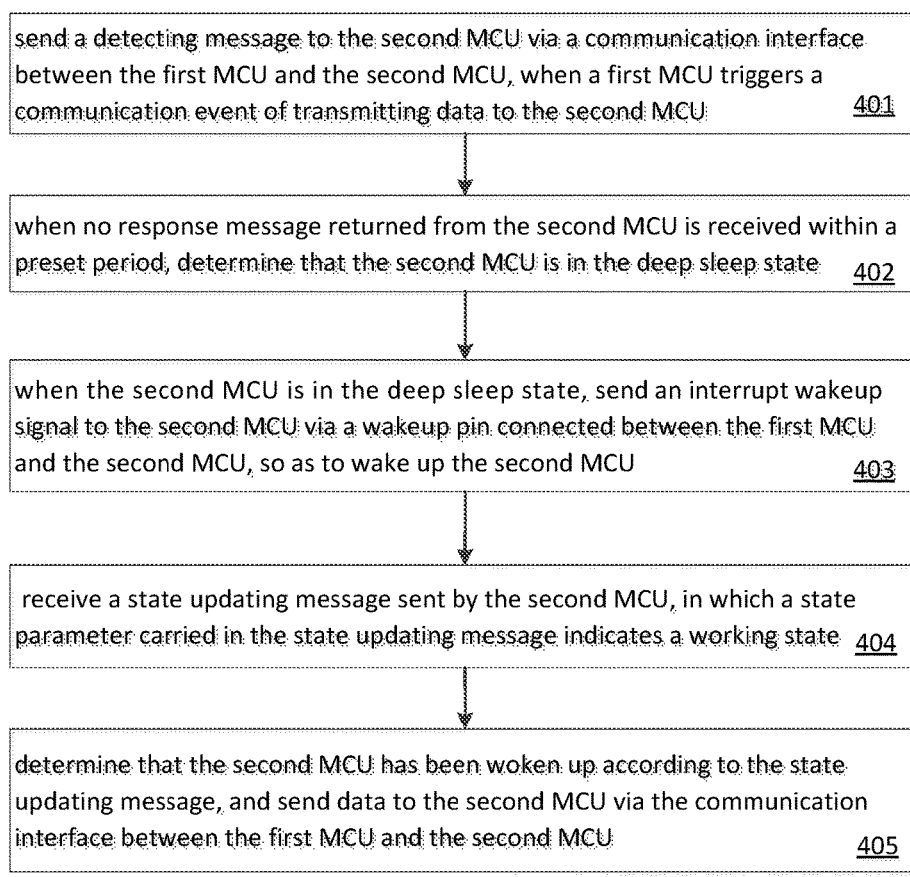
FIG. 4 is an example flow chart of a method for waking up a MCU according to an exemplary embodiment.

In the present disclosure, a method for waking up a MCU is provided, which may be applied to an intelligent device. As shown in FIG. 4, the method includes following steps.

In step 401, a detecting message is sent to the second MCU via a communication interface between a first MCU and the second MCU, when the first MCU triggers a communication event of transmitting data to the second MCU.

In the present disclosure, the register of each MCU may not store the parameter list. Thus, when the first MCU wishes to determine the state of the second MCU, it sends a detecting message to the second MCU, so as to determine whether the second MCU is in the deep sleep state.

In step 402, when no response message returned from the second MCU is received within a preset period, it is determined that the second MCU is in the deep sleep state.

When the second MCU is in the working state, the second MCU will return a response message when receiving the detecting message sent from the first MCU, such that the first MCU may determine that the second MCU is in the working state according to the response message.

When the second MCU is in the deep sleep state, the second MCU will not receive the detecting message and thus will not return the response message, i.e., step 402 will be performed.

Accordingly, when determining that the second MCU is in the deep sleep state, the first MCU will perform a wakeup procedure, and perform a communication procedure after the second MCU is woken up.

In step 403, when the second MCU is in the deep sleep state, an interrupt wakeup signal is sent to the second MCU via a wakeup pin connected between the first MCU and the second MCU, so as to wake up the second MCU.

Here, the wakeup pin is connected between the first MCU and the second MCU, such that the interrupt wakeup signal may be sent to one MCU via the wakeup pin connected between two MCUs when the MCU is in the deep sleep state, thus waking up the MCU via an interrupt event triggered from outside, besides via an inner interrupt event triggered when there is a need to execute the relevant logic.

In step 404, a state updating message sent by the second MCU is received, where a state parameter carried in the state updating message indicates a working state.

Here, a communication interface is also connected between the first MCU and the second MCU, where the communication interface may be a serial port, an Inter-Integrated Circuit I2C interface, a Serial Peripheral Interface SPI, and etc. Communication in forms like sending data and sending the state updating message may be performed via the communication interface.

After the second MCU is woken up by the external interrupt wakeup message from the first MCU, the second MCU sends the state updating message to the first MCU via the communication interface, where the state parameter carried in the state updating message indicates the working state.

In step 405, it is determined that the second MCU has been woken up according to the state updating message, and data is transmitted to the second MCU via the communication interface between the first MCU and the second MCU.

In the embodiments of the present disclosure, the first MCU determines that the second MCU is woken up according to the state parameter in the state updating message sent by the second MCU, and thus triggers the operation of sending data to the second MCU.

Alternatively or additionally, in another embodiment of the present disclosure, when one of the first MCU and the second MCU is controlled to get into the deep sleep state, it may not send the state updating message to the other MCU. Instead, when the MCU is woken up via an external interrupt wakeup signal, it sends the state updating message to the other MCU, so as to inform the other MCU that communication procedure may be performed. Thus, there may be no need to save the state parameter according to the state updating message.

In the embodiments of the present disclosure, by sending the interrupt wakeup signal to the second MCU via the wakeup pin connected between the first MCU and the second MCU, the MCU in the deep sleep state may be woken up by other MCUs through triggering an external interrupt event, without waiting for an inner interrupt event in the MCU under the deep sleep state, thus improving the efficiency of communication between MCUs.

Figure 5:
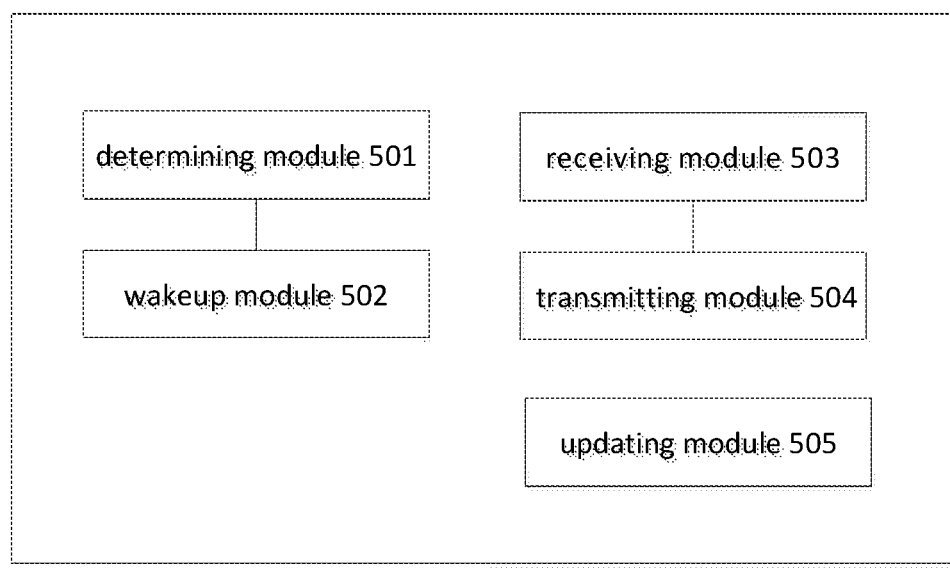
FIG. 5 is an example block diagram of a device for waking up a MCU according to an exemplary embodiment.

Corresponding to the method of waking up a MCU in the above exemplary embodiment of the present disclosure, a device for waking up a MCU is provided in another exemplary embodiment of the present disclosure, which may be applied to an intelligent device. As shown in FIG. 5, the device includes a determining module 501 and a wakeup module 502.

The determining module 501 is configured to determine whether a second MCU is in a deep sleep state, when a first MCU triggers a communication event of transmitting data to the second MCU.

The wakeup module 502 is configured to send an interrupt wakeup signal to the second MCU via a wakeup pin connected between the first MCU and the second MCU if the second MCU is in the deep sleep state, so as to wake up the second MCU.

Figure 6:
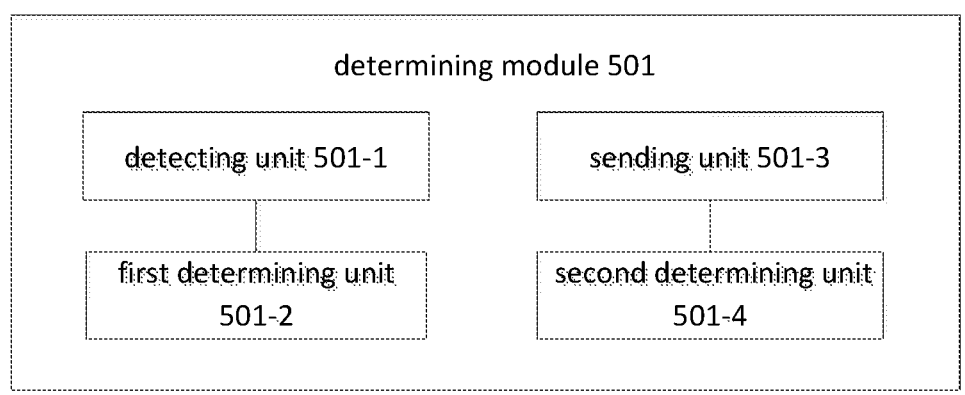
FIG. 6 is an example block diagram of a determining module in a device for waking up a MCU according to an exemplary embodiment.

As shown in FIG. 6, the determining module 501 includes a obtaining unit 501-1 and a first determining unit 501-2.

The obtaining unit 501-1 is configured to obtain a pre-stored state parameter of the second MCU, where the pre-stored state parameter of the second MCU is determined according to a first state updating message sent by the second MCU.

The first determining unit 501-2 is configured to determine that the second MCU is in the deep sleep state, if the pre-stored state parameter of the second MCU indicates the deep sleep state.

As shown in FIG. 6, the determining unit 501 includes a sending unit 501-3 and a second determining unit 501-4.

The sending unit 501-3 is configured to send a detecting message to the second MCU via a communication interface between the first MCU and the second MCU.

The second determining unit 501-4 is configured to determine that the second MCU is in the deep sleep state, if no response message returned from the second MCU is received within a preset period.

As shown in FIG. 5, the device may further include a receiving module 503 and a transmitting module 504.

The receiving module 503 is configured to receive a second state updating message sent by the second MCU, where a state parameter carried in the second state updating message indicates a working state.

The transmitting module 504 is configured to determine that the second MCU has been woken up according to the second state updating message, and to transmit data to the second MCU via a communication interface between the first MCU and the second MCU.

As shown in FIG. 5, the device may further include an updating module 505.

The updating module 505 is configured to update the pre-stored state parameter of the second MCU according to the state parameter carried in the second state updating message.

Figure 7:
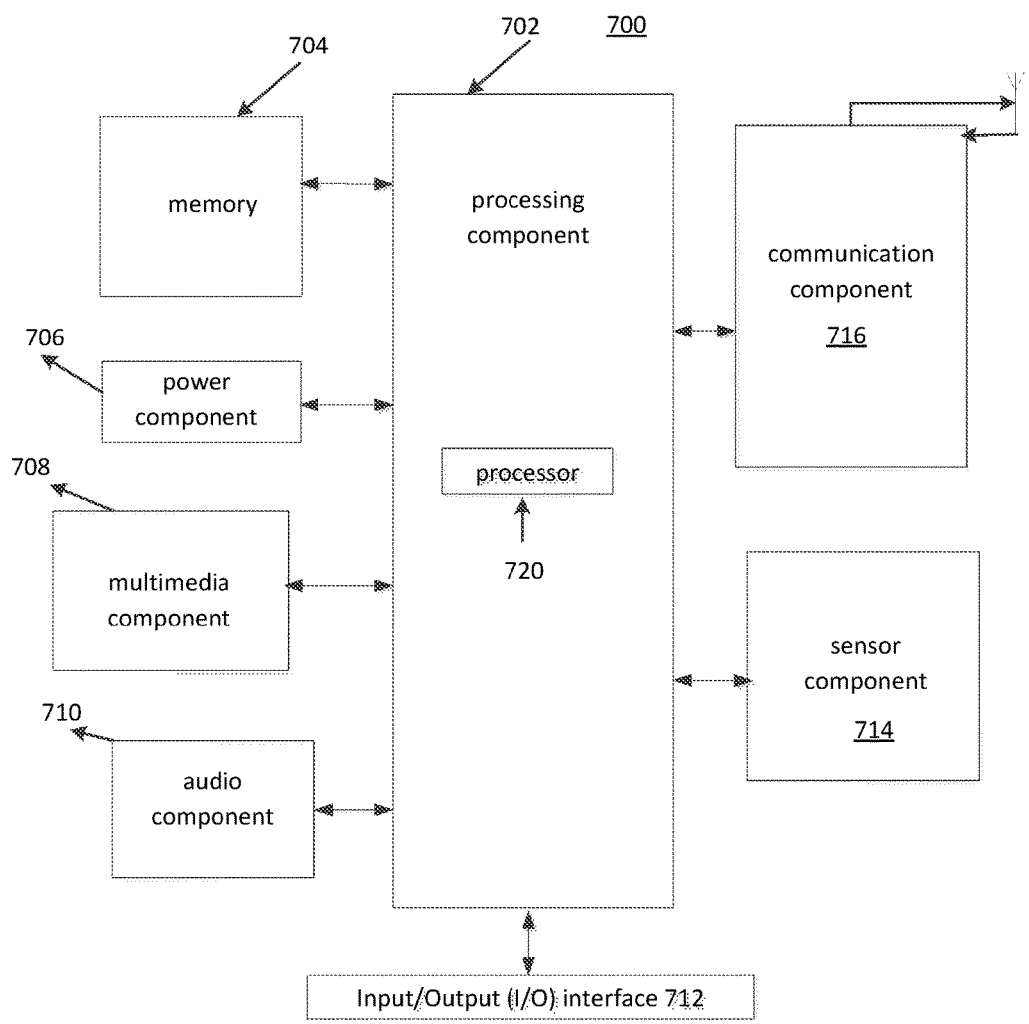
FIG. 7 is an example schematic diagram of a device for waking up a MCU (a general structure of an intelligent device) according to an exemplary embodiment.

Corresponding to the device for waking up a MCU provided in the above exemplary embodiment of the present disclosure, an intelligent device 700 is provided in another exemplary embodiment of the present disclosure, as shown in FIG. 7. For example, the intelligent device 700 may be a mobile phone, a computer, a digital broadcasting terminal, a messaging device, a game console, a tablet device, fitness equipment, a Personal Digital Assistant PDA, and a terminal etc. Alternatively or additionally, the intelligent device 700 may also be an intelligent router, an intelligent air purifier, an intelligent water purifier, and an intelligent camera, etc.

Referring to FIG. 7, the intelligent device 700 may include the following one or more components: a processing component 702, a memory 704, a power component 706, a multimedia component 708, an audio component 710, an Input/Output (I/O) interface 712, a sensor component 714, and a communication component 716.

The processing component 702 typically controls overall operations of the intelligent device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the intelligent device 700. Examples of such data include instructions for any applications or methods operated on the intelligent device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the intelligent device 700. The power component 706 may include a power management system, one or more power sources, and any other components associated with the generation, management, and distribution of power in the intelligent device 700.

The multimedia component 708 includes a screen providing an output interface between the intelligent device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 708 includes a front camera and/or a rear camera. The front camera and the rear camera may receive external multimedia data while the intelligent device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the intelligent device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface for the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may obtain an open/closed status of the intelligent device 700 and relative positioning of components (e.g., the display and the keypad of the intelligent device 700). The sensor component 714 may also obtain a change in position of the intelligent device 700 or of a component in the intelligent device 700, a presence or absence of user contact with the intelligent device 700, an orientation or an acceleration/deceleration of the intelligent device 700, and a change in temperature of the intelligent device 700. The sensor component 714 may include a proximity sensor configured to obtain the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate wired or wireless communication between the intelligent device 700 and other devices. The intelligent device 700 can access a wireless network based on a communication standard, such as WIFI, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the intelligent device 700 may be implemented with a processing circuitry including one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods. Each module may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example.

In exemplary embodiments, there is also provided a non-transitory computer readable storage medium including instructions, such as the memory 704 including instructions. The above instructions are executable by the processor 720 in the intelligent device 700, for performing the above-described methods. For example, the non-transitory computer-readable storage medium may be a ROM, a RAM, a CD-ROM, a magnetic tape, a floppy disc, an optical data storage device, and the like.

In the present disclosure, by sending the interrupt wakeup signal to the second MCU via the wakeup pin connected between the first MCU and the second MCU, the MCU in the deep sleep state may be woken up by other MCUs through triggering an external interrupt event, without waiting for an inner interrupt event in the MCU under the deep sleep state, thus improving the efficiency of communication between MCUs.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for waking up a Microcontroller Unit (MCC), comprising;
   determining, by a first MCC, whether a second MCU is in a deep sleep state, when the first MCU triggers a communication event of transmitting data to the second MCU; and
   when the second MCU is in the deep sleep state, sending, by the first MCU, an interrupt wakeup signal to the second MCU via a wakeup pin of the second MCU that is in electrical communication with the first MCU, so as to wake up the second MCU;

wherein determining whether the second MCU is in a deep sleep state comprises:

obtaining a pre-stored state parameter of the second MCU in a register of the first MCU according to a first state updating message sent by the second MCU wherein the pre-stored state parameter is updated according to a state updating message; and when the pre-stored state parameter of the second MCU indicates the deep sleep state, determining that the second MCU is in the deep sleep state.

2. The method according to claim 1, wherein determining whether the second MCU is in a deep sleep state comprises:

sending a detecting message to the second MCU via a communication interface between the first MCU and the second MCU; and when no response message returned from the second MCU is received within a preset period, determining that the second MCU is in the deep sleep state.

3. The method according to claim 1, further comprising:

receiving a second state updating message sent by the second MCU, where a state parameter carried in the second state updating message indicates a working, state; and determining that the second MCU has, been woken up according to the second state updating message, and transmitting data to the second MCU via a communication interface between the first MCU and the second MCU.

4. The method according to claim 3, further comprising:

updating the pre-stored state parameter of the second MCU according to the state parameter carried in the second state updating message.

5. A device, comprising:

a first Microcontroller Unit (MCU);

a second MCU in communication with the first MCU via a wakeup pin connected between the first MCU and the second MCU;

wherein the first MCU is configured to;

determine whether the second MCU is in a deep sleep state, when the first MCU triggers a communication event of transmitting data to the second MCU;

when the second MCU is in the deep sleep state, send an interrupt wakeup signal to the second MCU via the wakeup pin to wake up the second MCU;

obtain a pre-stored state parameter of the second MCU, where the pre-stored state parameter of the second MCU is determined according to a first state updating message sent by the second MCU wherein the pre-stored state parameter is updated according to a state updating message; and if the pre-stored state parameter of the second MCU indicates the deep sleep state, determine that the second MCU deep sleep state.

6. The device according to claim 5, wherein the first MCU is configured to:

send a detecting message to the second MCU via a communication interface between the first MCU and the second MCU; and if no response message returned from the second MCU is received within a preset period, determine that the second MCU is in the deep sleep state.

7. The device according to claim 5, wherein the first MCU is further configured to:

receive a second state updating message sent by the second MCU, where a state parameter carried in the second state updating message indicates a working state; and determine that the second MCU has been woken up according to the second state updating message, and transmit data to the second MCU via a communication interface between the first MCU and the second MCU.

8. The device according to claim 7, wherein the first MCU is further configured to:

update the pre stored state parameter of the second MCU according to the state parameter carried in the second state updating message.

9. A non-transitory computer-readable storage medium having stored therein instructions that, when executed by a first Microcontroller Unit (MCU) of an intelligent device, causes the first MCU to:

when the first MCU triggers a communication event of transmitting data to a second MCU, determine whether the second MCU is in a deep sleep state: and when the second MCU is in the deep sleep state, send an interrupt wakeup signal to the second MCU via a wakeup pin connected between the first MCU and the second MCU, so as to wake up the second MCU;

wherein to determine whether the second MCU is in a deep sleep state, the instructions further comprise instructions to cause the first MCU to:

obtain a pre-stored state parameter of the second MCU, where the pre-stored state parameter of the second MCU is determined according to a first state updating message sent by the second MCU wherein the pre-stored state parameter is updated according to a state updating message; and if the pre-stored state parameter of the second MCU indicates the deep sleep state, determine that the second MCU is in the deep sleep state.

10. The storage medium according to claim 9, wherein determining whether the second MCU is in a deep sleep state comprises:

sending a detecting message to the second MCU via a communication interface between the first MCU and the second MCU; and if no response message returned from the second MCU is received within a preset period, determining that the second MCU is in the deep sleep state.

11. The storage medium according to claim 9, wherein the instructions further comprise instructions to cause the first MCU to:

receive a second state updating message sent by the second MCU, where a state parameter carried in the second state updating message indicates a working state: and determine that the second MCU has been woken up according to die second state updating message, and transmit data to the second MCU via a communication interface between the first MCU and the second MCU.

12. The storage medium according to claim 11, wherein the instructions further comprise instructions to cause the first MCU to:

update the pre-stored state parameter of the second MCU according to the state parameter carried in the second state updating. message.

* * * * *